United States Patent [19]

Hahn

[11] Patent Number: 4,682,724
[45] Date of Patent: Jul. 28, 1987

[54] WELDING APPARATUS

[76] Inventor: Helmut Hahn, 4096 Glanford Avenue, Victoria, British Columbia, Canada, V8Z 4A2

[21] Appl. No.: 904,881

[22] Filed: Sep. 8, 1986

[30] Foreign Application Priority Data

Mar. 12, 1986 [CA] Canada .................................. 502712

[51] Int. Cl.⁴ .............................................. B23K 5/22
[52] U.S. Cl. ...................................... 228/50; 219/160
[58] Field of Search .................... 228/50, 216; 219/160

[56] References Cited

U.S. PATENT DOCUMENTS

| | | | |
|---|---|---|---|
| 2,887,972 | 5/1959 | Handley | 228/50 |
| 3,570,109 | 3/1971 | Harlan et al. | 228/50 |
| 3,741,457 | 6/1973 | Gwin et al. | 228/50 |
| 4,165,831 | 8/1979 | Connell | 228/50 |
| 4,285,458 | 8/1981 | Slavens | 219/160 |

Primary Examiner—Nicholas P. Godici
Assistant Examiner—Karen Skillman
Attorney, Agent, or Firm—Christie, Parker & Hale

[57] ABSTRACT

A welding backup shoe apparatus that comprises a double-acting fluid cylinder having a piston rod extending from it. A first retainer shoe is attachable to the piston rod and a second retainer shoe is opposed to the first retainer shoe. A first backup shoe to be received by the first retainer shoe and at least two other backup shoes are received by the first retainer shoe and by the second retainer shoe. The backup shoe is arcuate externally to be a close fit within a pipe. A guide is attached to the first retainer shoe, slidably engaging the second retainer shoe to guide the movement of the retainer shoes relative to each other. A release device is attached to the cylinder to abut the first backup shoe; and cables attach the two other backup shoes to the cylinder.

20 Claims, 8 Drawing Figures

WELDING APPARATUS

FIELD OF THE INVENTION

This invention relates to a welding backup shoe apparatus.

DESCRIPTION OF THE PRIOR ART

In welding a circular joint in pipe, from the exterior of the pipe, it is necessary to ensure that the weld metal penetrates slightly past the interior pipe surface to completely fuse the adjoining pipe ends. The size and consistency of the weld penetration, referred to as a root bead, is particularly important in pipes that carry compressed liquids and gases.

Numerous backup systems for the welding of pipes are known. They are all designed to provide an internal backing across the joint between the pipes to be welded to receive the molten weld metal and thus aid in the formation of an uninterrupted, consistent internal weld. Generally speaking the prior art combines backup capability with means to urge the adjoining pipe ends into proper alignment with each other. However most prior art equipment provides only incomplete weld backup, due to difficulties associated with collapsing a complete backup shoe assembly in a restricted space. These difficulties increase with decreasing pipe diameter.

Because of relatively complex and sturdy mechanical construction no prior art system appears to be able to be used in medium and smaller size pipes, that is pipes of 20" down to 3" internal diameter and this is even more pronounced where curved pipe components, for example elbows and 180° returns, are joined to straight lengths of pipe. Interruption or other irregularities of the internal pipe weld profile, brought about by incomplete backup, provides an even larger proportion of the total weld with decreasing pipe sizes. Indeed the majority of pipe weld defects are root pass related.

SUMMARY OF THE INVENTION

The present invention seeks to provide a welding backup shoe apparatus that is simple to use and effective in providing a good quality weld.

Accordingly the present invention is a welding backup shoe apparatus comprising a double-acting fluid cylinder having a piston rod extending from it; a first retainer shoe attachable to the piston rod; a second retainer shoe opposed to the first retainer shoe; a first backup shoe to be received by the first retainer shoe; at least two other backup shoes to be received by the first retainer shoe and by the second retainer shoe; the backup shoe being arcuate externally to be a close fit within a pipe of a predetermined internal diameter; guide means attached to the first retainer shoe, slidably engaging the second retainer shoe to guide the movement of the retainer shoes relative to each other; release means attached to the cylinder to abut the first backup shoe; and cables to attach the at least two other backup shoes to the cylinder.

The retainer shoes are typically formed with external channels to receive the backup shoes.

One retainer shoe may be an integral part of the piston housing, or be releasably fastened to it for interchangeability.

The backup shoes are formed with external channels to receive weld metal and the first backup shoe abuts the ends of the other two backup shoes on a radial line. This arrangement enables movement of the first backup shoe relative to the other backup shoes. The backup shoes are desirably made from materials that are heat-resistant, heat conductive and of sufficient mass both to absorb heat and conduct it away from the weld. The preferred compounds include copper alloys and ceramics.

In a preferred embodiment the guide means comprises rods extending from a first retainer shoe. There are housings on the cylinder that slidably receive the rod and openings in the second retainer shoes that also receive the rods in sliding fashion. These rods are preferably of such length that upon retraction of the cylinder the rods extend through the openings in the second retainer shoe to push the cylinder out of the backup shoes. They also prevent the backup shoes being received by the second retaining shoe until the cylinder is extended again. This is of prime importance in extracting the equipment from the pipe, once the weld has been made.

The releasing means desirably comprises a rod extending from the cylinder and able to abut the pipe interior. That is the rod abuts the backup shoe and simply knocks it from the pipe if the weld metal tends to retain it in position.

It is desirable that there be two cables attaching the two backup shoes to the cylinder. Each cable is sufficiently long to permit initial movement of the cylinder out of contact with the backup shoes, that is to allow the backup shoes to remain in position in the weld region. Then further pulling of the cylinder means that the backup shoes are dragged from the pipe and then trailed behind the cylinder as it is dragged behind the cylinder along the pipe to an exit position.

In order to facilitate smooth movement of the apparatus along the pipe it is desirable to provide it with wheels, extending outwardly to contact the internal surface of the pipe.

In a desirable embodiment the backup shoes may include means to receive seals, extending from the backup shoes to the pipe to form a gas tight seal. This is particularly desirable where materials such as aluminum and stainless steel are being welded. In the prior art it is typically necessary to purge with inert gas, such as argon, before welding these materials.

In a further desirable aspect the invention includes spikes extending outwardly from the retainer shoes to contact a section of the pipe to hold the sections of the pipe in a fixed, predetermined relative position prior to the start of welding.

In yet a further desirable aspect the invention includes clamping means to locate the apparatus accurately within a pipe. The clamping means may comprise hingedly attached arcuate members with blades projecting inwardly so that pipe sections to be welded may abut each side of the blade. The blade also engages the backup shoes in the interior of the pipe. There are means to compress the arcuate members together, for example a spring-loaded handle.

DRAWINGS

Aspects of the invention are illustrated, merely by way of example, in the accompanying drawings in which.

DESCRIPTION OF THE PREFERRED EMBODIMENTS

Figure 1:
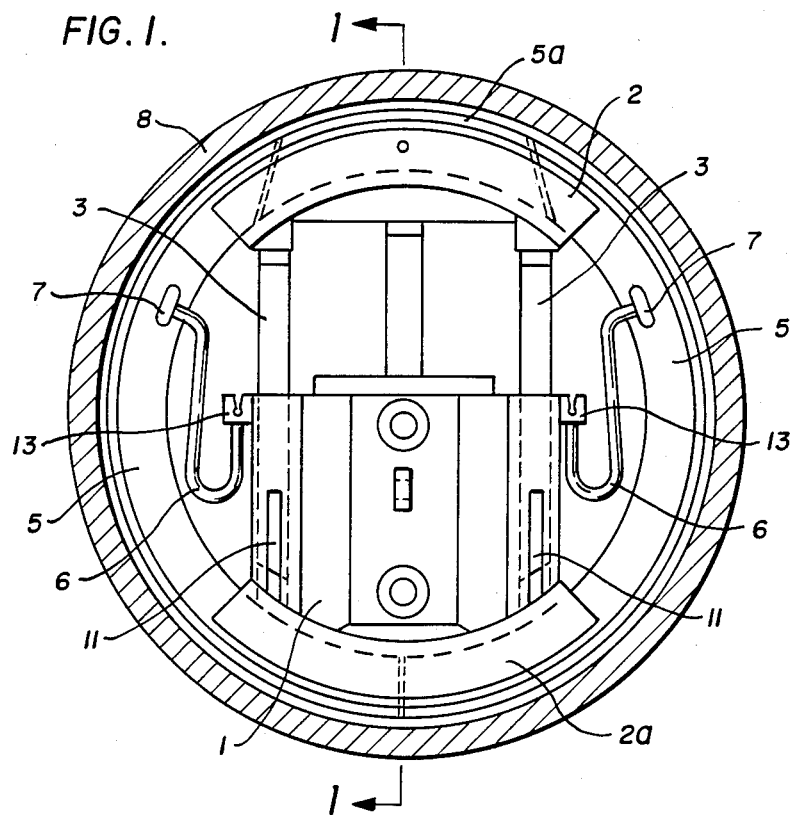
FIG. 1 is an end view of the apparatus of the invention.

The drawings show a welding backup shoe apparatus comprising a fluid, double-acting cylinder 1, a lower retaining shoe 2a and an upper retaining shoe 2. There are backup shoe assemblies 5 and 5a. The shorter backup shoe 5a, is fastened to upper retainer shoe 2. The longer backup shoes 5 engage partially in lower and upper retaining shoes 2 and 2a to form an uninterrupted ring.

The backup shoes 5 and 5a have a central shallow groove 12 around the outer circumference to receive weld metal that penetrates a gap 23 between pipes 8 and 9 to be joined.

Figure 3:
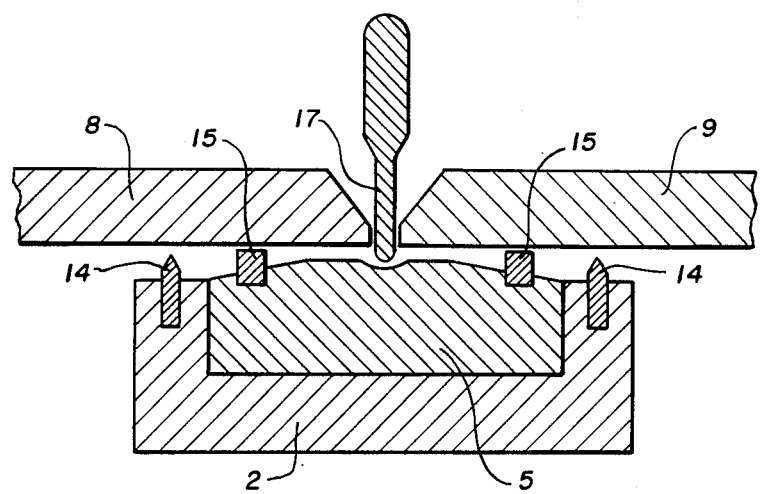
FIG. 3 is a cross section on the line b—b of FIG. 2, with backup and retainer shoes with spikes and seals.

As shown most clearly in FIG. 3 the retaining shoes 2 and 2a include spikes 14 to engage the interior surface of the pipes 8 and 9 when the equipment is in use to prevent relative movement of the pipes 8 and 9 once the welding has started. As also shown in FIG. 3 refractory fibrous seals 15 may be installed in the backup shoes 5 and 5a to prevent atmospheric contamination of the molten weld material, for example when welding stainless steel or aluminum. The apparatus includes a spiral cable 16 used to pull the apparatus through the open end of a pipe.

There are extraction cables 6 for the backup shoes 5. The cables 6 engage hooks 7 on the backup shoes 5 and bracket 13 on the cylinder 1.

Figure 4:
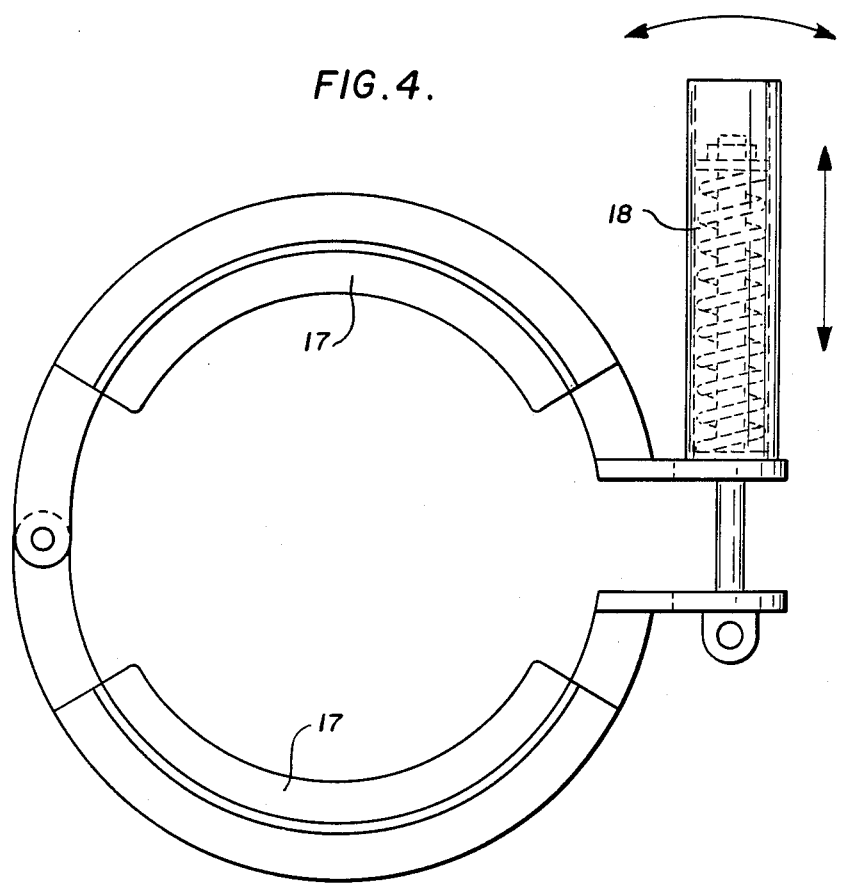
FIG. 4 is an end view of the clamp configuration.

FIG. 4 shows an external clamp, useful in making a weld with the apparatus of the present invention. The clamp comprises external clamp blades 17, pivotally attached to each other, and a spring-loaded handle 18.

The apparatus further includes wheeled transport mechanisms 20 and a release rod 21.

To use the apparatus of the present invention to weld two pipes 8 and 9 together first the hydraulic cylinder 1 is fully retracted and the backup shoes 5 are removed. The apparatus is then inserted into pipe 8 with cable 16 being used to draw the apparatus into the open end of pipe 8.

Figure 5:
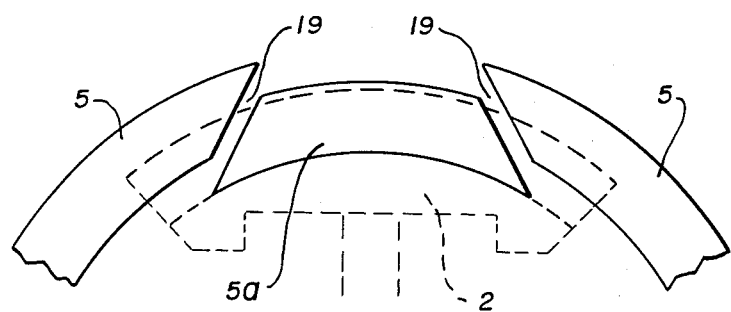
FIG. 5 shows schematically the backup shoe assembly and its capability of reducing diameter.

The upper retainer shoe 2 with the short backup shoe 5a fastened in it, is expanded to just short of a full stroke. Backup shoes 5 are placed into retainer shoes 2 and 2a and butted up end to end at the centre of the lower retainer shoe 2a. The upper portion of the backup shoe 5 engage partially on either side of upper retainer shoe 2. Backup shoe extraction cables 6 are now inserted into brackets 13. The external clamp of FIG. 4 is positioned with the blade 17 in the groove 12 in the backup shoes and locked in position with spring-loaded handle 18. The gaps 19, as shown in FIG. 5, between the backup shoes 5 and 5a are closed, reducing the outside dimension of the backup shoe assembly 5 and 5a sufficiently for friction-free insertion into pipe 9. The apparatus is now inserted into pipe 9 until the pipe end abuts tightly against external clamp blade 17. Pipe 8 fits over the apparatus and against the other side of blade 17.

Cylinder 1 is expanded to full stroke and pressure. Spikes 14 thus engage the interior of the walls of the pipes 8 and 9. The backup shoe segments 5 and 5a are urged against the interior surface of the pipes 8 and 9. The external clamp is removed and welding commences.

Once one welding pass has been made fluid cylinder 1 is retracted and, with it, retaining shoe 2. Lower retainer shoe 2a then lifts away from backup shoes 5. Before the stroke is completed release rod 21 engages the top inner surface of the pipe 9 and frees the upper retainer shoe 2, together with backup shoe 5a, from the adjoining backup shoes 5. A pull on the line 10 separates fluid cylinder 1 from the backup shoes 5.

In this regard it should be noted that the weld bead extends through the pipe joint to fill the groove 12 so that side movement of the backup shoes is not possible. However, as indicated above, the lower retainer shoe 2a lifts out of the backup shoe 5 at the beginning of the down stroke of the fluid cylinder. If there is any adherence between the upper backup shoe and the weld or between the adjoining backup shoes 5 the release rod 21 will engage against the pipe surface and free the upper retaining shoe, together with the upper backup shoe, from the long backup shoes.

Figure 6:
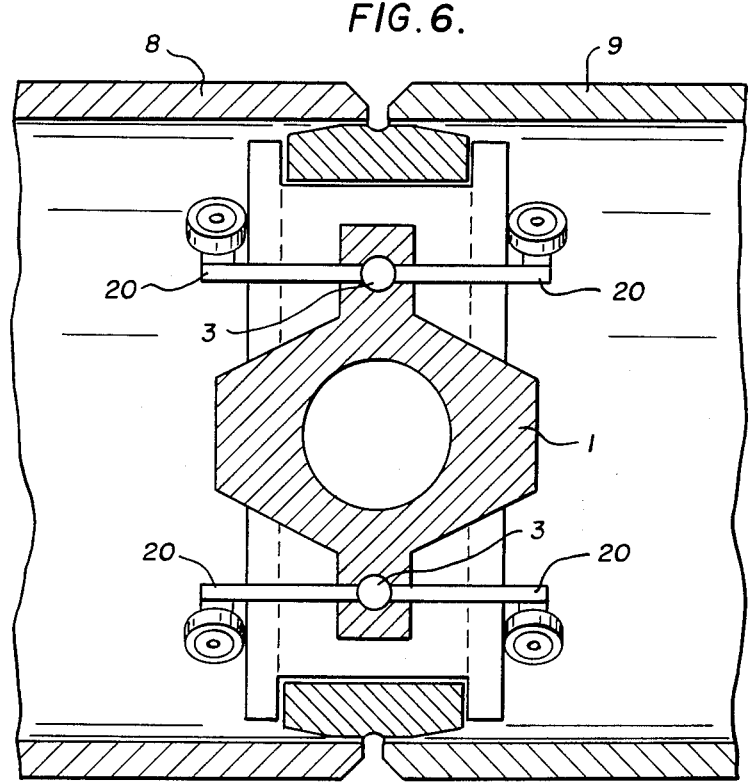
Figure 6 is a cross section on the line 1—1 of FIG. 1.
Figure 7:
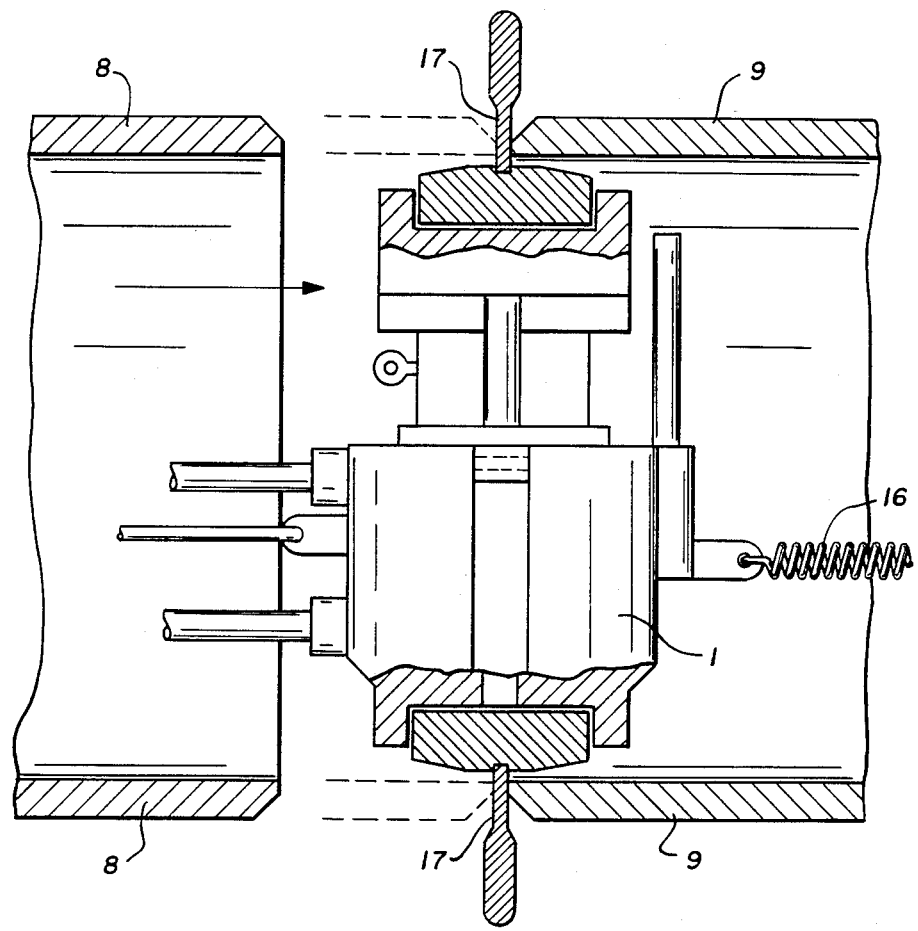
FIG. 7 illustrates the placing of the apparatus within pipe sections to be welded.

As shown particularly in FIG. 6 the guide rods move downward during retraction to protrude through the lower retainer shoe 2a. This prevents reentry of the backup shoes 5 into the lower retainer shoe groove. At the end of the retraction stroke transport mechanism 20, fastened to guide rods 3, and extending through the slots 11 engages the bottom of the pipe surface 8 and 9 to facilitate removal. The backup shoe extraction cable 6 frees backup shoes 5 from weld location and the shoes are removed from the pipe interior together with the remainder of the apparatus.

Figure 2:
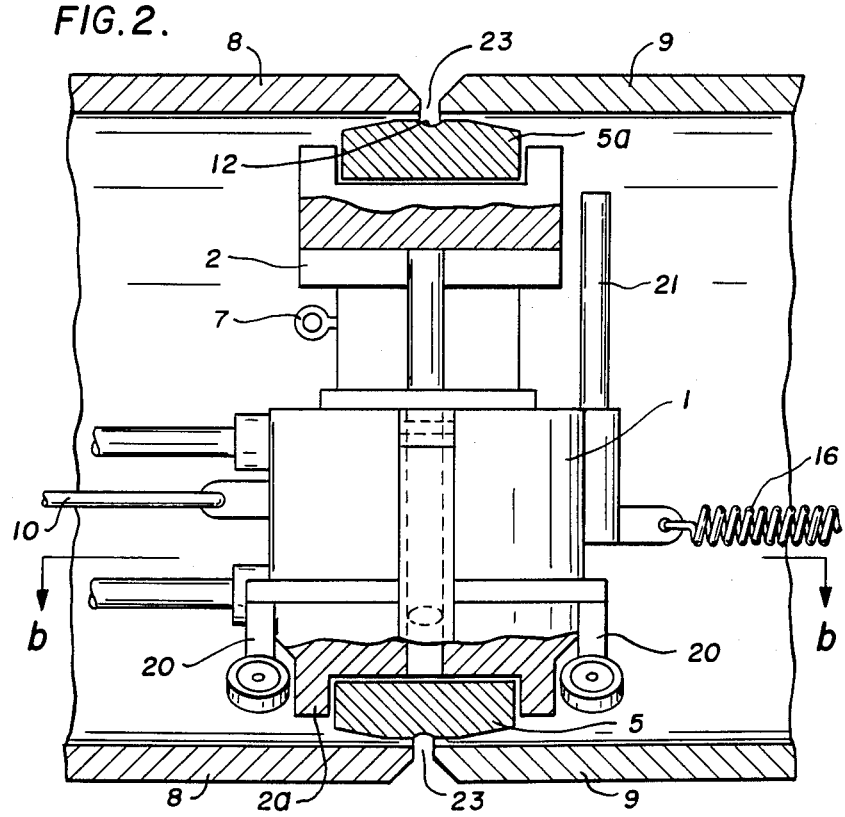
FIG. 2 is a partial cross section of the apparatus.

It should be noted that for ease of illustration the spike 14, seals 15 and transport mechanism 20 are only shown in FIGS. 2, 3 and 6.

Figure 8:
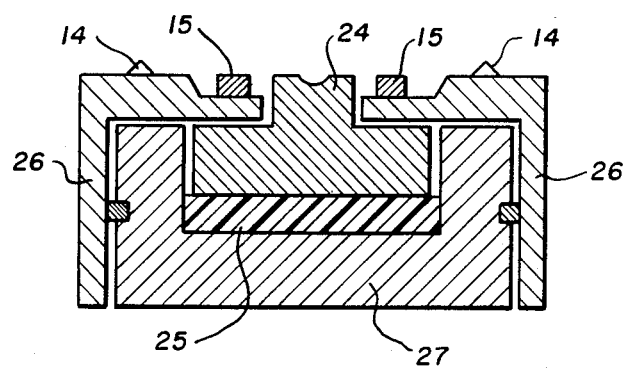
FIG. 8 illustrates the arrangement of ceramic shoes.

FIG. 8 shows the integration of ceramic segments for backup shoes 24 formed on a glass reinforced plastic cushion 25 with clip-on shoes 26 and special retainer shoes 27 engaging shoes 2 and 2a the same way as shoes 5 shown, for example, in FIG. 1. The overall dimensions in cross sectional area are approximately the same as the cross sectional area of the copper backup shoes but may be a little bigger.

For the rest the other dimensions are identical to the backup shoes previously described, that is one short backup shoe, having a radially angled sides and two long backup shoes encircling the remaining inner surface of the pipe and fitting into the retainer shoes 2 and 2a as previously described.

As shown in FIG. 8 the arrangement ensures retention of the configuration and permits the use of seals and spikes 14 and 15 without subjecting the ceramic backup shoes 24 to any physical stress. The glass reinforced cushion 25 brings the ceramic segment into contact with the pipe surface. To reduce the chances of ceramic particles broken away by heat shock falling in the pipe only a small neck is exposed.

A further safeguard in this regard is to embed a thin wire thread, extending up into the neck, to anchor loose pieces to the rest of the ceramic body.

By this means the invention permits convenient integration of ceramic segments, a feature essential where contamination of the weld metal by another metallic substance must be avoided. Work done to date indicates that aluminum oxide is the preferred material for the ceramic backup shoes.

Thus the apparatus of the present invention offers considerable advantages over prior art welding backup shoes. Ease of use is a particular virtue. The backup shoes 5 and 5a also serve in the chilling of the weld material to prevent sagging of the molten weld, which can be particularly pronounced in the overhead position of the weld joint. Minimal clearance between the adjoining backup shoes 5 and 5a is required to prevent weld metal embedding in the joints.

The spikes 14 eliminate the requirement of tack welding necessary in most prior art equipment. Furthermore the seals 15 prevent contamination of the molten weld material from the pipe interior and eliminate costly internal purging procedures with argon gas when, for example, metal such as aluminum and stainless steel is welded.

The apparatus of the present invention makes possible the application of the GMAW process or thin wire gas process which is four to five times faster than the other welding method but cannot tolerate gaps in the backing because of the relatively strong thrust of the weld puddle or the possibility of the wire, which is about thirty five thousandths of an inch diameter or thinner, being forced through the gap into the pipe interior. This is believed to be a very significant advantage. Only one or two companies in the United States have developed an orbital SMAW pipe welder for medium size pipes but in that known equipment the first pass must be put in with an expensive orbital TIG robot. The use of an orbital TIA robot is extremely expensive.

The present invention also provides a superior root bead quality. In other systems the gap precision possible with the present invention, due to the clamp of the present invention, shown in FIG. 4, is not possible. The present invention however permits the precise location of the backup groove 12 beneath the gap. After the welding variables have been experimentally established the amount of penetrating metal should be just enough to fill the backup shoe groove 12 which can be gauged according to specification. The present invention permits a root bead of ideal profile, free of defects and exerting the minimum influence on the flow of components within the welded pipe. The external clamp is a particular virtue in this application in allowing precise positioning and allowing precise control of the gap between adjoining pipe sections.

The interchangeability of the retainer shoes is also an important feature of the present invention. It allows the use of the hydraulic equipment over a limited range of pipe sizes which is significant in the medium size pipe range where half inch steps are common.

I claim:

1. A welding backup shoe apparatus comprising:
   a double-acting fluid cylinder having a piston rod extending from it;
   a first retainer shoe attachable to the piston rod;
   a second retainer shoe opposed to the first retainer shoe;
   a first backup shoe to be received by the first retainer shoe;
   at least two other backup shoes to be received by the first retainer shoe and by the second retainer shoe;
   the backup shoe being arcuate externally to be a close fit within a pipe of a predetermined internal diameter;
   guide means attached to the first retainer shoe, slidably engaging the second retainer shoe to guide the movement of the retainer shoes relative to each other;
   release means attached to the cylinder to abut the first backup shoe; and
   cables to attach the at least two other backup shoes to the cylinder.

2. Apparatus as claimed in claim 1 in which the retainer shoes are formed with external channels to receive the backup shoes.

3. Apparatus as claimed in claim 1 in which the first retainer shoe is integral with the piston rod.

4. Apparatus as claimed in claim 1 in which the first retainer shoe is releasably attached to the piston rod.

5. Apparatus as claimed in claim 1 in which the backup shoes are formed with external channels to receive weld metal.

6. Apparatus as claimed in claim 1 in which the first backup shoe abuts the ends of the at least two other backup shoes on a radial line, to enable movement of the first backup shoe relative to the two other backup shoes.

7. Apparatus as claimed in claim 1 in which the backup shoes are of a material selected from the group consisting of copper alloy and ceramic.

8. Apparatus as claimed in claim 1 in which the backup shoes are dimensioned to have sufficient mass to provide good heat absorption.

9. Apparatus as claimed in claim 1 in which the guide means comprise rods extending from the first retainer shoe;
   housings on the cylinder to slidably receive the rod;
   openings in the second retainer shoes to slidably receive the rods.

10. Apparatus as claimed in claim 9 in which the rods are of such lengths that upon retraction of the cylinder the rods extend through the openings in the second retainer shoe to push the cylinder out of the backup shoes and prevent the backup shoes being received by the second retainer shoe until the cylinder is extended.

11. Apparatus as claimed in claim 1 in which the releasing means comprises a rod extending from the cylinder and able to abut the upper retaining shoe.

12. Apparatus as claimed in claim 1 in which there are two cables, each sufficiently long to permit initial movement of the cylinder out of contact with the at least two other backup shoes, the further pulling of the cylinder dragging the backup shoes along the pipe, behind the cylinder.

13. Apparatus as claimed in claim 1 including wheels attached to the apparatus to facilitate movement along a pipe.

14. Apparatus as claimed in claim 1 in which the backup shoes include means to receive seals extending from the backup shoes to the pipe to form a gas tight seal.

15. Apparatus as claimed in claim 1 including spikes extending outwardly from the retainer shoes to contact a section of pipe to hold the sections of pipe in a fixed, predetermined relative position prior to the start of welding.

16. Apparatus as claimed in claim 1 in combination with clamping means to locate the apparatus accurately within a pipe.

17. Apparatus as claimed in claim 16 in which the clamping means comprises hingedly attached arcuate members;

blades projecting inwardly so that pipe sections to be welded may abut each side of the blade, the blade also engaging the backup shoes in the interior of the pipe; and means to compress the arcuate members together.

18. Apparatus as claimed in claim 17 in which the means to compress the arcuate members together comprises a spring-loaded handle.

19. Apparatus as claimed in claim 1 in which the backup shoes are ceramic;

a clip-on shoe to locate and protect each ceramic shoe and extending over the shoe and over the retainer shoe;

an opening in the clip-on shoe through which the backup shoe projects;

a cushion within the retainer shoe to cushion the backup shoe.

20. Apparatus as claimed in claim 19 in which the cushion is a glass reinforced plastic.

* * * * *